Dec. 2, 1969 W. M. DAY 3,482,063

ACOUSTIC DEVICE FOR RECEIVING A SMALL PORTABLE RADIO OR SIMILAR ARTICLE

Filed March 7, 1967

INVENTOR
William M. Day

BY [signature]
ATTORNEY 3,482,063
ACOUSTIC DEVICE FOR RECEIVING A SMALL PORTABLE RADIO OR SIMILAR ARTICLE

William M. Day, Rumson, N.J., assignor to Westinghouse Electric Corporation, Pittsburgh, Pa., a corporation of Pennsylvania Filed Mar. 7, 1967, Ser. No. 621,350
Int. Cl. H04m *1/04;* H04b *1/08*
U.S. Cl. 179—146 5 Claims

ABSTRACT OF THE DISCLOSURE

The present disclosure relates to an acoustical device for receiving a self-contained sound reproducing device such as a portable radio. The acoustical device is constructed of a foamed plastic material to protect the sound reproducing device and is so shaped to enhance the sound output therefrom.

The present invention relates to acoustical devices and, more particularly, to acoustical devices adapted to receive sound reproducing devices.

A major limitation of small portable sound reproducing devices, such as transistor radios and tape recorders, is their limited sound output. This is especially apparent when such devices are used in large noisy areas, such as at beaches, swimming pools or other recreational areas. One of the reasons for the limited sound output is the relative lack of directivity of the sound emanating from the speaker of the sound reproducing device. The sound emitted into the outdoor area is thus dispersed over a relatively large dispersion angle which substantially attenuates the amplitude of sound as received by a listener. Also, the utilization of a small sound transducer in an outdoor area does not lend itself to the efficient transfer of sound into air. Moreover, because the portable sound reproducing devices are usually placed at ground level, such as on the beach, there is relatively poor transfer of sound from the device to the ears of the listener.

Portable sound reproducing devices such as transistor radios and tape recorders are additionally highly susceptible to damage when used in recreational areas. This damage is frequently caused by someone stepping on the device and also is caused by sand, water or other material being kicked or splashed onto the device. Portable radios and tape recorders of the type in question are usually provided with carrying cases, however, these cases afford minimal protection against the type of damage to be encountered at recreational areas.

It is, therefore, an object of the present invention to provide a new and improved acoustical device adapted to receive a self-contained sound reproducing device.

It is a further object to provide a new and improved acoustical device adapted to receive a self-contained sound reproducing device wherein the sound output of the reproducing device is directed by the acoustical device.

It is a further object to provide a new and improved acoustical device adapted to receive a sound reproducing device wherein there is an efficient transfer of sound from the sound reproducing device into the surrounding medium.

It is still a further object of the present invention to provide a new and improved acoustical device adapted to receive a self-contained sound reproducing device wherein the acoustical device may be readily mounted for improved transfer of sound to a listener.

It is an additional object to provide a new and improved acoustical device adapted to receive a sound reproducing device wherein the sound reproducing device is protected against damage.

It is still another object of the present invention to provide a new and improved acoustical device adapted to receive a self-contained sound reproducing device wherein the acoustical device provides ready access for removal of the sound reproducing device plus directing the sound output thereof.

Briefly, the above cited objects are accomplished by providing an acoustical device adapted to receive a self-contained sound reproducing device in which the acoustical device includes therein an enclosure portion which defines a chamber having one end closed and the other end open to receive the sound reproducing device so that sound will be directed from the device in a desired direction. Space is provided within the enclosure portion to permit ready access to the sound reproducing device for mounting and removal.

These and other objects and advantages of the present invention will become more apparent when considered in view of the following specification and drawings, in which.

Figures 1, 2, 3:
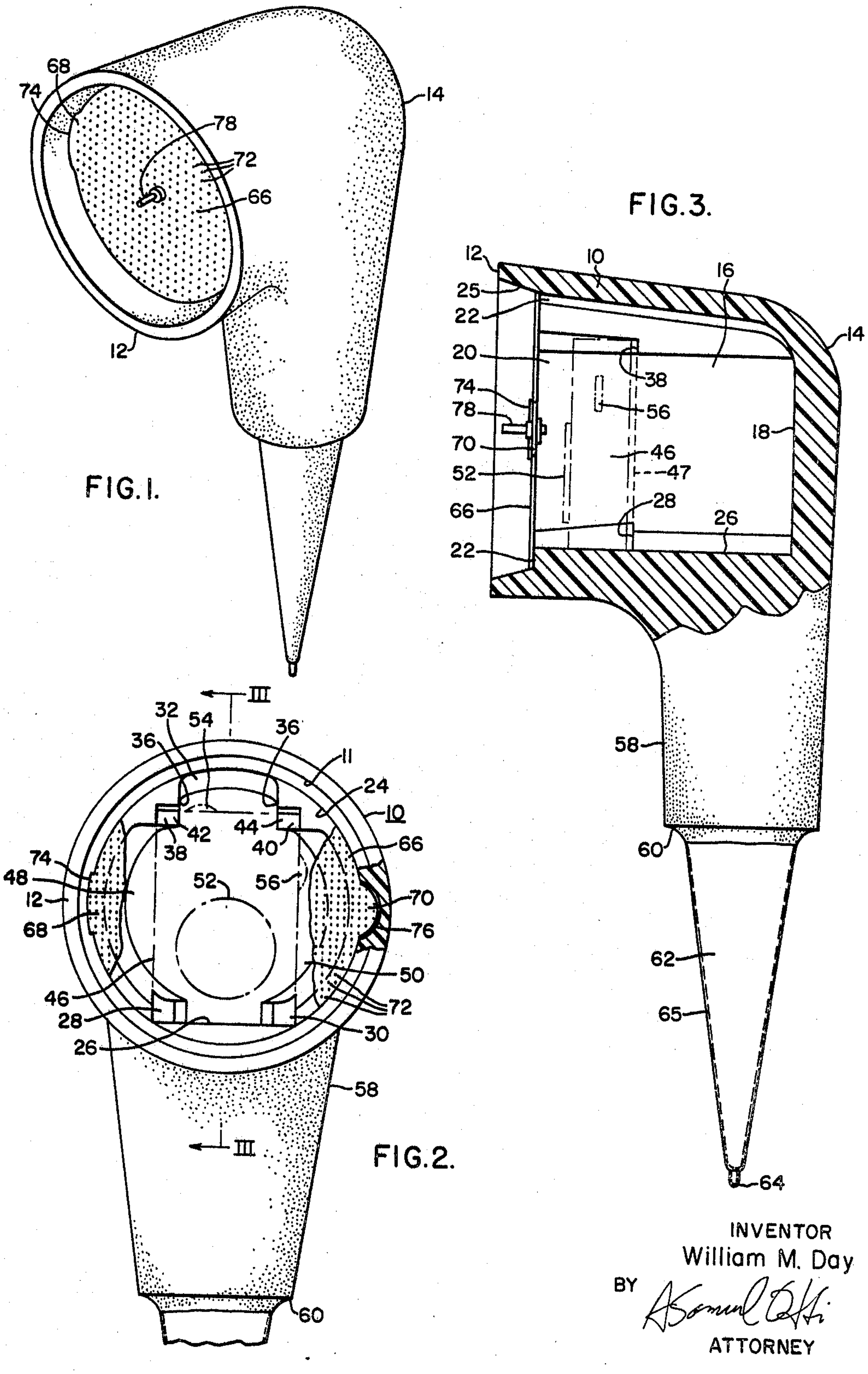
FIGURE 1 is a pictorial diagram of the acoustical device of the present invention.
FIG. 2 is a frontal view of the acoustical device of the present invention.
FIG. 3 is a side sectional view taken along the line III—III of FIG. 2.

Referring now to the figures, the acoustical device of the present invention is shown and is preferably fabricated by molding from a foamed plastic material, such as, expanded polystyrene or other similar foamed plastic materials. The device is molded by any of the well known processes for molding such foamed plastic materials. However, it should be understood that other materials could of course be utilized, but the use of expanded polystyrene is desirable because it is: relatively light in weight, easy to fabricate, resilient to impact to protect a sound reproducing device placed therein and low in material cost.

The acoustical device includes an enclosure portion 10 which has a circular front portion 12 and a curved outer back portion 14. Within the enclosure portion 10 is defined a chamber 16 which is closed at the back inner portion 18 thereof and is open at the front portion 20 thereof. The chamber 16 thus takes a substantially cylindrical or horn shape with the front end thereof being open.

The enclosure portion 10 includes a recessed portion 22 to define the frontal openings 20 of the chamber 16. A surface 24 forms the inner surface of the enclosure portion 10 to define the chamber 16. The enclosure portion 10 also includes a lip portion 25 which extends from the recessed portion 22 to the front portion 12. The lip portion 12 is slightly flared out toward the front portion 12 to aid in directing sound from the chamber 16. A slot 26 is cut into the inner surface 24 at the bottom portion of the chamber 16 and extends rearwardly through the entire depth of the chamber 16 and has a substantially flat shape. A pair of stop portions 28 and 30 extend from the inner surface 24 into the bottom slot 26 at a predetermined distance from the recessed portion 22. The portions 28 and 30 thus provide stop portions for a sound reproducing device to be disposed therein.

At the top of the chamber 16, a top slot 32 appears which extends from the recessed portion 22 backwardly through the entire depth of the chamber 16 to the closed end portion 18 thereof. The top slot 32 has a pair of side walls 34 and 36. Cut into the side walls 34 and 36 are a pair of slots 38 and 40, respectively. The top securing slots 38 and 40 extend from the recessed portion 22 rearwardly into the chamber 16 until a stop portion 42 and a stop portion 44 are reached, respectively. The slots 38 and 40 serve to act as a mounting for the sound reproducing device to be inserted into the chamber 16 with the stop portions 42 and 44 defining the furthest insertion depth for such a device.

To illustrate the mounting position of a sound reproducing device within the chamber 16, such a device is shown in dotted lines inserted therein and which may comprise a portable radio 46. The portable radio 46 has substantially a rectangular shape with the bottom portion thereof being disposed in the slot 26 so that the bottom corners fit into the slots 26 and are received into the chamber until the back surface 47 of the radio 46 engages the stop portions 28 and 30 of the slot 26. The top corners of the radio are inserted into the slots 42 and 40 with the back portion 47 of the radio engaging the stop portions 42 and 44 of the respective slots. A space 48 and a space 50 are provided on the respective sides of the radio 46 to permit the user to place the radio 46 readily into the slots 26, 38 and 40.

The radio 46 includes a speaker 52 with the radio 46 being so disposed within the chamber 16 so that the speaker is facing toward the user. Sound emanating from the speaker 52 is thus directed outwardly from the chamber 16 toward the user. The lip portion 25 of the enclosure portion 10 directs the sound from the speaker 22 toward the user, with dispersion angle of sound being thus limited to thereby enhance the directivity of the sound as received by the user in the line of the axis of the speaker. Moreover, since the chamber 16 is closed at the end 18 thereof, there is a reinforcement of the sound emanating from the front portion of the radio 46 that would be otherwise lost due to any openings in the back portion of the radio. Also, it has been observed that the substantially horn shaped chamber 16 tends to enhance the sound output from the radio 46 especially at base frequencies. The sound enhancement was obtained using an acoustical device such as shown in FIGS. 1, 2 and 3 with FIGS. 2 and 3 being drawn to one-half scale. In addition to low frequency reinforcement provided by the substantially horn shaped chamber 16, an improved efficiency of transfer of energy from the speaker 52 into the air is provided by the disposition of the radio 46 within the chamber 16 utilizing an enclosure comprising a foamed plastic material. Thus, the overall sound output of the radio 46 from the speaker 52 thereof is enhanced due to the directive nature of the enclosure portion, the shape of the chamber 16 and the improved transfer of energy to air due to the enclosure. Of course, other factors may contribute to the improved sound output of the radio 46 within the enclosure as compared to a radio without the enclosure as provided herein.

The portable radio 46, as is common practice, includes an on-off volume control dial 54 and a station tuning dial 56. The on-off volume control dial 54 appears within the opening of the slot 32 so as to permit access thereto so that a user can insert his finger and turn the radio 46 on or off or adjust the volume thereof. The station tuning dial 56 appears in the space 50 within the chamber 16 so that the user may select desired stations without removing the radio 46 from its mounting position within the chamber 16.

Extending downwardly from the enclosure portion 10 of the acoustic device and integral therewith is a body portion 58. The body portion 58 has a tapering diameter until reaching a stop portion 60 thereon. A substantially conical shaped mounting portion 62 then extends downwardly to a point 64 from the abutting portion 60. The mounting portion 62 is so shaped to permit its easy insertion into a porous medium, such as sand, so that the acoustic device may be mounted with the mounting portion 52 inserted into the medium and holding the radio 46 disposed within the enclosure portion 10 above ground level so as to provide a platform for the emanation of sound therefrom. This then increases the amount of sound that will be received by a user since the radio is placed higher than the usual ground level.

The mounting portion 62 has disposed thereon a layer 65 which advantageously comprises an epoxy resin to seal the foamed plastic material and thereby increase the strength of the mounting portion 62 of the acoustic device. The pointed end 64 is also coated with the sealing material. The added strength of the mounting portion 62 enables the acoustic device to be easily inserted into sand and greatly reduces the possibility of breaking the mounting portion 62 thereof.

A protective mask 66 is also provided to further protect the sound reproducing device 46 from damage which might occur from sand or water. The protective mask 66 has a disc shape and includes thereon tab portions 68 and 70 which extend from the opposite edges of the mask 66. A plurality of holes 72 are disposed within the mask 66 to permit sound from the speaker 52 to pass readily therethrough without substantial attenuation. With the radio 46 disposed in place as shown, the protective mask 66 is fitted over the front portion of the chamber 16 to abut the recessed portion 22 of the enclosure portion 10. A slot 74 and a slot 76 are provided into the lip portion 19 and are disposed on the horizontal axis of the chamber 16. The slots 74 and 76 are adapted to receive respectively the tab portions 68 and 70 of the protective mask 66. The mask 66 is fabricated of a flexible material so as to permit its easy disposition over the opening 20 of the chamber 16 with the tab portions 68 and 70 thereof engaging into the slots 74 and 76, respectively, with the back portion of the mask 66 resting against the recessed portion 22. A stud 78 is secured to the center of the mask 66 and extends outwardly therethrough to permit a user to grasp the mask 66 more easily to aid in the insertion and removal of the mask from the chamber 16. The plurality of holes 72 are selected to have such a diameter as to permit sound to be transmitted therethrough from the chamber 16 without the substantial attenuation of sound, however, are of a small enough diameter to prevent sand or other materials from passing therethrough and damaging the radio 46.

The acoustical device thus described protects the sound reproducing device from damage by enclosing it in a foamed plastic container, which is resilient and is, in fact, often used for packaging purposes. Moreover, the protective mask 66 completes the protective structure for the sound reproducing device while permitting the substantially unattenuated passage of sound therethrough. Also, the design of the enclosure portion of the chamber 16 is such to direct the sound output from the sound reproducing device, thus enhancing its sound output. The mounting portion 62 makes it relatively easy for the securing of the acoustical device within sand and places the sound reproducing device above ground level to avoid damage thereto as well as effectively enhancing the sound output to users. Additionally, the spaces provided within the chamber permit the ready placement and removal of the sound reproducing device, as well as permitting on-off, volume and tuning control without the necessity of removing the radio from the acoustical device.

Although the present invention has been described with a certain degree of particularity, it should be understood that the present disclosure has been made by way of example and that numerous changes can be made in the details of construction and the combination and arrangement of the portions and parts thereof without departing from the scope and spirit of the present invention.

I claim as my invention:

1. An acoustical device adapted to receive a self-contained sound reproducing device, said acoustic device including:

an enclosure portion defining a chamber being closed at one end thereof and open at the other end thereof for receiving said sound reproducing device so that sound emanating from said sound reproducing device is directed from said open end, said enclosure portion including a mounting portion thereon for mounting said sound reproducing device within said chamber and permitting the ready removal of said sound reproducing device therefrom, said enclosure portion including spaces therein to permit access to said sound reproducing device for selecting the sound output thereof, and said chamber being substantially horn shaped to enhance the sound output of said sound reproducing device.

2. An acoustical device adapted to receive a self-contained sound reproducing device, said acoustical device including an enclosure portion defining a chamber being closed at one end thereof and open at the other end thereof for receiving said sound reproducing device so that sound emanating from said sound reproducing device is directed from said open end, said enclosure portion including a mounting portion thereon for mounting said sound reproducing device within said chamber and permitting the ready removal of said sound reproducing device therefrom, a base portion adjacent said enclosure portion for mounting said acoustical device in a usable position and directing sound in a desired direction, said base portion including an end portion thereon having a shaped portion for inserting said end portion into a porous media and securing said acoustical device in place, 3. The acoustical device of claim 2 wherein:

a coating layer is disposed on said end portion to increase the strength thereof.

4. The acoustical device of claim 2 includes:

a protective mask removably disposed over the open end of said chamber for protecting said sound reproducing device from damage yet permitting sound to pass substantially unattenuated therethrough, said protective mask including tab portions thereon, and said enclosure portion including slots therein adapted for receiving said tab portions of said protective mask so that said mask can be mounted over the open end of said chamber.

5. The acoustical device of claim 4 wherein:

said protective mask includes a stud portion thereon to facilitate the removal of said mask from said enclosure portion.

References Cited

UNITED STATES PATENTS

| | | | |
|---|---|---|---|
| 3,391,754 | 7/1968 | Montanaro ---------- | 325—325 |
| 3,162,813 | 12/1964 | Piccinini ----------- | 325—361 |

KATHLEEN H. CLAFFY, Primary Examiner

BARRY PAUL SMITH, Assistant Examiner

U.S. Cl. X.R.

325—361